US012589975B2

(12) United States Patent
Makinen et al.

(10) Patent No.: US 12,589,975 B2
(45) Date of Patent: Mar. 31, 2026

(54) METHOD AND AN ARRANGEMENT FOR ALIGNING ELEVATOR GUIDE RAILS

(71) Applicant: Kone Corporation, Helsinki (FI)

(72) Inventors: Harri Makinen, Helsinki (FI); Mikael Haag, Helsinki (FI); Joonas Jokela, Helsinki (FI); Markku Haivala, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/510,048

(22) Filed: Nov. 15, 2023

(65) Prior Publication Data

US 2024/0083715 A1 Mar. 14, 2024

Related U.S. Application Data

(63) Continuation of application No. PCT/EP2021/063737, filed on May 24, 2021.

(51) Int. Cl.
*B66B 19/00* (2006.01)
*B66B 7/02* (2006.01)

(52) U.S. Cl.
CPC ............ *B66B 19/002* (2013.01); *B66B 7/024* (2013.01)

(58) Field of Classification Search
CPC .............................. B66B 19/002; B66B 7/024
See application file for complete search history.

(56) References Cited

U.S. PATENT DOCUMENTS

| | | | | |
|---|---|---|---|---|
| 4,593,794 A * | 6/1986 | Russeau | B66B 19/002 52/745.2 |
| 9,751,728 B2 * | 9/2017 | Mertala | E04G 3/246 |

FOREIGN PATENT DOCUMENTS

| | | | |
|---|---|---|---|
| CA | 3117423 A1 * | 6/2020 | B66B 19/002 |
| EP | 2872432 A1 | 5/2015 | |
| EP | 2993152 B1 | 3/2017 | |
| EP | 2872432 B1 | 6/2017 | |
| EP | 3581536 A1 | 12/2019 | |
| EP | 3766820 A1 | 1/2021 | |
| WO | WO-2019063356 A1 * | 4/2019 | B66B 19/00 |

OTHER PUBLICATIONS

Machine Translation of EP 3766820.*
International Search Report and Written Opinion for International Application No. PCT/EP2021/063737 dated Jan. 14, 2022.

* cited by examiner

*Primary Examiner* — Diem M Tran
(74) *Attorney, Agent, or Firm* — Harness, Dickey & Pierce, P.L.C.

(57) ABSTRACT

A method and arrangement for aligning elevator guide rails includes a measuring step and a separate aligning step. The alignment of guide rails supported with adjustable fastening members in the shaft is measured in several measurement points along the height of the guide rail line based on at least one reference line provided in the vicinity of the guide rails. The measurement results are stored into a memory. The guide rails are aligned based on the measurement results stored in the memory. The aligning step is carried out after the measurement results of all measurement points have been stored in the memory.

15 Claims, 9 Drawing Sheets

METHOD AND AN ARRANGEMENT FOR ALIGNING ELEVATOR GUIDE RAILS

CROSS-REFERENCE TO RELATED APPLICATION

Figure 1:
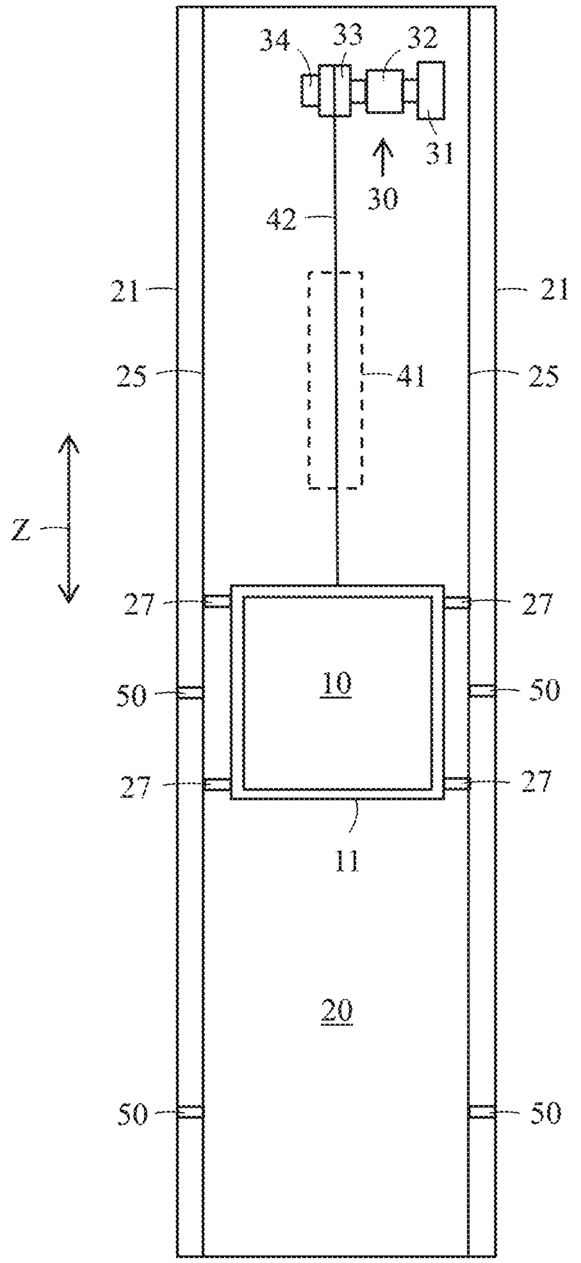

This application is a continuation of PCT International Application No. PCT/EP2021/063737 which has an International filing date of May 24, 2021, the entire contents of which are incorporated herein by reference.

FIELD

The invention relates to a method and an arrangement for aligning elevator guide rails.

BACKGROUND

An elevator may comprise a car, a shaft, hoisting machinery, ropes, and a counterweight. A separate or an integrated car frame may surround the car.

The hoisting machinery may be positioned in the shaft. The hoisting machinery may comprise a drive, an electric motor, a traction sheave, and a machinery brake. The hoisting machinery may move the car upwards and downwards in the shaft. The machinery brake may stop the rotation of the traction sheave and thereby the movement of the elevator car.

The car frame may be connected by the ropes via the traction sheave to the counterweight. The car frame may further be supported with guiding means at guide rails extending in the vertical direction in the shaft. The guide rails may be attached with fastening brackets to the side wall structures in the shaft. The guiding means keep the car in position in the horizontal plane when the car moves upwards and downwards in the shaft. The counterweight may be supported in a corresponding way on guide rails that are attached to the wall structure of the shaft.

The car may transport people and/or goods between the landings in the building. The wall structure of the shaft may be formed of solid walls or of an open beam structure or of any combination of these.

EP 2 872 432 B1 discloses a guide rail straightness measuring system for elevator installations. The measurement of the guide rail line may be based on reference lines arranged in the vicinity of the guide rails. The guide rail may be aligned by using a manual measurement apparatus to measure the position of the guide rail in relation to the reference line.

EP 2 993 152 B1 discloses an apparatus and a method for aligning guide rails in an elevator shaft. The alignment apparatus comprises a positioning unit and an alignment unit. The position unit extends horizontally across the elevator shaft in the direction between the guider rails (DBG direction) and comprises first attachment means movable in the DBG direction at each end of the positioning unit for supporting the positioning unit on opposite wall structures in the elevator shaft. The alignment unit extends across the elevator shaft in the DBG direction and is movably supported with support parts on each end portion of the positioning unit and comprises second attachment means movable in the DBG direction at each end of the alignment unit for supporting the alignment unit on opposite guide rails in the shaft, means for moving the attachment means in the DBG direction, and means for moving each support part separately horizontally in relation to the positioning unit in the direction from the back to the front in the shaft (BTF direction) being perpendicular to the DBG direction, said second attachment means comprising gripping means for gripping the guide rail. Opposite guide rails can be adjusted with the alignment apparatus in relation to each other and in relation to the elevator shaft so that the opposite guide rails extend in a common vertical plane, and so that the opposite guide rails are at the same distance from the back of the shaft. The alignment tool may comprise a local memory into which the measurement results may be stored. The measurement results may also be sent to a remote memory.

The conditions in an elevator shaft are, however, harsh during the alignment work. The reference lines may be formed of plumb wires in which case the plumb wires may move because of air flow in the shaft or the technician may accidentally hit the plumb wires during the alignment work. The visibility in the shaft is often poor which may make it difficult the read the measurement and/or alignment tools.

The environmental conditions may, especially in slender high-rise buildings, affect the building and thereby also the elevator shaft within the building. The top of a slender high-rise building may move tens of centimetres during the day due to strong sun rise and/or due to strong wind. This movement will cause problems during a conventional alignment process of the guide rails in the shaft. A conventional alignment process in which the measuring of the alignment of the guide rail line and the aligning of the guide rail line are performed simultaneously can be done only during optimal conditions i.e. during calm nights. This may prolong the alignment process considerably because each night does not provide optimal environmental conditions.

SUMMARY

An object of the invention is an improved method and arrangement for aligning elevator guide rails.

The method for aligning elevator guide rails according to the invention is defined in claim 1.

The arrangement for aligning elevator guide rails according to the invention is defined in claim 11.

The invention may contribute to an improved quality of the alignment process of the guide rails.

The invention separates the measuring step and the aligning step into two separate steps that may be carried out independently of each other at different times. The measuring step may be done in optimal environmental conditions, which means that the shaft is straight during the measuring step. The reference lines form thus global reference lines during the measuring step. The position of the guide rail line measured in relation to the global reference line will thus determine the actual position of the guide rail line in the straight shaft in the DBG and in the BTF direction.

The global reference lines may then later in the separate aligning step be used as local reference lines or the global reference lines may be totally superfluous in the aligning step. The global reference lines could in the latter case be removed from the shaft after the measuring step has been completed. The measurement results of the measuring step are recorded and documented i.e. stored in a memory and can thus be used at any time later after the measuring step has been completed. The measurement results stored in the memory may be used later in a separate aligning step for aligning the guide rails. There is no need for any measuring step based on global reference lines in the later separate aligning step. The guide rails may be aligned based on the measurement results stored in the memory. The recoding step may be performed simultaneously with the measuring step. The measurement results received during the measurement of the alignment of the guide rail line at each fastening means may be recorded in the memory once they have been received.

The invention makes it possible to carry out the measuring step when the environmental conditions at the site are optimal. Optimal environmental conditions are needed to make sure that the shaft is straight when the measuring step is performed. Optimal environmental conditions at the site are achieved when the building is not subject to strong wind and/or strong sun heat. The separate aligning step of the guide rails may then be done at any later time regardless of the environmental conditions. The separate aligning step may be done based on the measurement results stored in the memory. The measurement results may be used to adjust the position of the guide rails so that the alignment of the guide rails is achieved at each measurement point. Optimal environmental conditions are only needed when the measuring step is carried out.

The measuring step may comprise measuring the actual position of the guide rail in the straight shaft at each measurement point in relation to the reference line. The actual position of the guide rail in the DGB direction and in the BTF direction in the straight shaft in relation to the reference line may thus be determined in the measuring step. The difference from the desired position of the guide rail in the DBG and the BTF direction may also be calculated from the measurement results. This difference forms a relative adjustment distance indicating how much the guide rail should be adjusted in the DBG direction and in the BTF direction to achieve the desired position in which the guide rail is aligned.

Position markers may further be used to enable the adjustment of the guide rail into the correct position based on the measurement results stored in the memory. The position markers may advantageously be arranged in connection with the adjustable fastening means used to attach the guide rails to the wall in the shaft. The fastening means may advantageously comprise two parts that are adjustable in relation to each other. A first part may be attached to the guide rail and a second part may be attached to a wall in the shaft. The two parts of the fastening means may be attached to each other so that the two parts become adjustable in relation to each other. The alignment of the guide rails may thus be done by adjusting the two parts of the fastening means in relation to each other. The adjustment of the two parts of the fastening means in relation to each other may be done based on the position markers provided on the two parts of the fastening means. The position of the position markers in relation to each other indicates the position of the two parts of the fastening means in relation to each other.

The position markers positioned on the two parts of the fastening means provides one advantageous solution for realizing the aligning step. Position markers could, however, instead or in addition to the position markers on the two parts of the fastening means be positioned at any place in the vicinity of the fastening means. Position markers could e.g. be positioned on the guide rails or on the walls in the shaft or on the divider beams supporting the guide rails in the shaft.

The separate aligning step may be performed also without the use of position markers.

The alignment without position markers may be done by e.g. using the global reference lines as local reference lines in the aligning step. The alignment may be done based on the local reference lines based on the results of the measuring step stored in the memory.

The measurement tool disclosed in EP 2 872 432 B1 could be used in the measuring step and in the separate aligning step for aligning the guide rails without markers. The global reference lines would thus be used as local reference lines in the aligning step. The following example clarifies the situation.

The measuring step may first be performed with the measurement tool. The measurement tool may in the measuring step give the result DBG=2 mm and BTF=2 mm for fastening means no 5.

The same measurement tool may then be used in the separate aligning step. The measurement tool may be used to determine the position of the guide rail 25 in relation to the local reference line. The measurement tool may in the aligning step give the result DBG=6 mm and BTF=6 mm for fastening means no 5. The difference in the measurement values achieved in the measuring step and in the separate aligning step are caused by the bending of the shaft during the separate aligning step. Adjustment of the guide rail at fastening means no 5 must be done according to the results achieved in the measuring step. The guide rail 25 should thus be adjusted to position DGB=4 mm and BTF=4 mm with the help of the measurement tool to achieve a correct position of the guide rail 25 in a straight shaft. The results DBG=2 mm and BTF=2 mm achieved in the measuring step are thus used in the adjustment of the fastening means in the aligning step.

The alignment tool disclosed in EP 2 993 152 B1 could be used in the measuring step and in the separate aligning step for aligning the guide rails without markers. The global reference lines would not be needed at all in the aligning step in this case.

The alignment tool may be used in the measuring step to measure the alignment of the guide rail line. The global reference lines may be used to determine the position of the alignment tool in the shaft. The position of the guide rails in the shaft are determined in relation to the position of the alignment tool in the shaft. This may be done directly in the alignment tool.

The alignment tool may then be used in the separate aligning step to align the guide rails. There is no need to know the position of the alignment tool in the shaft in the separate aligning step. The global reference lines are thus not needed in the aligning step. The alignment tool may directly adjust the position of the guide rails at each fastening means based on the measurement results stored into the memory.

The invention may be used in manual and in automated guide rail alignment.

DRAWINGS

Figure 2:
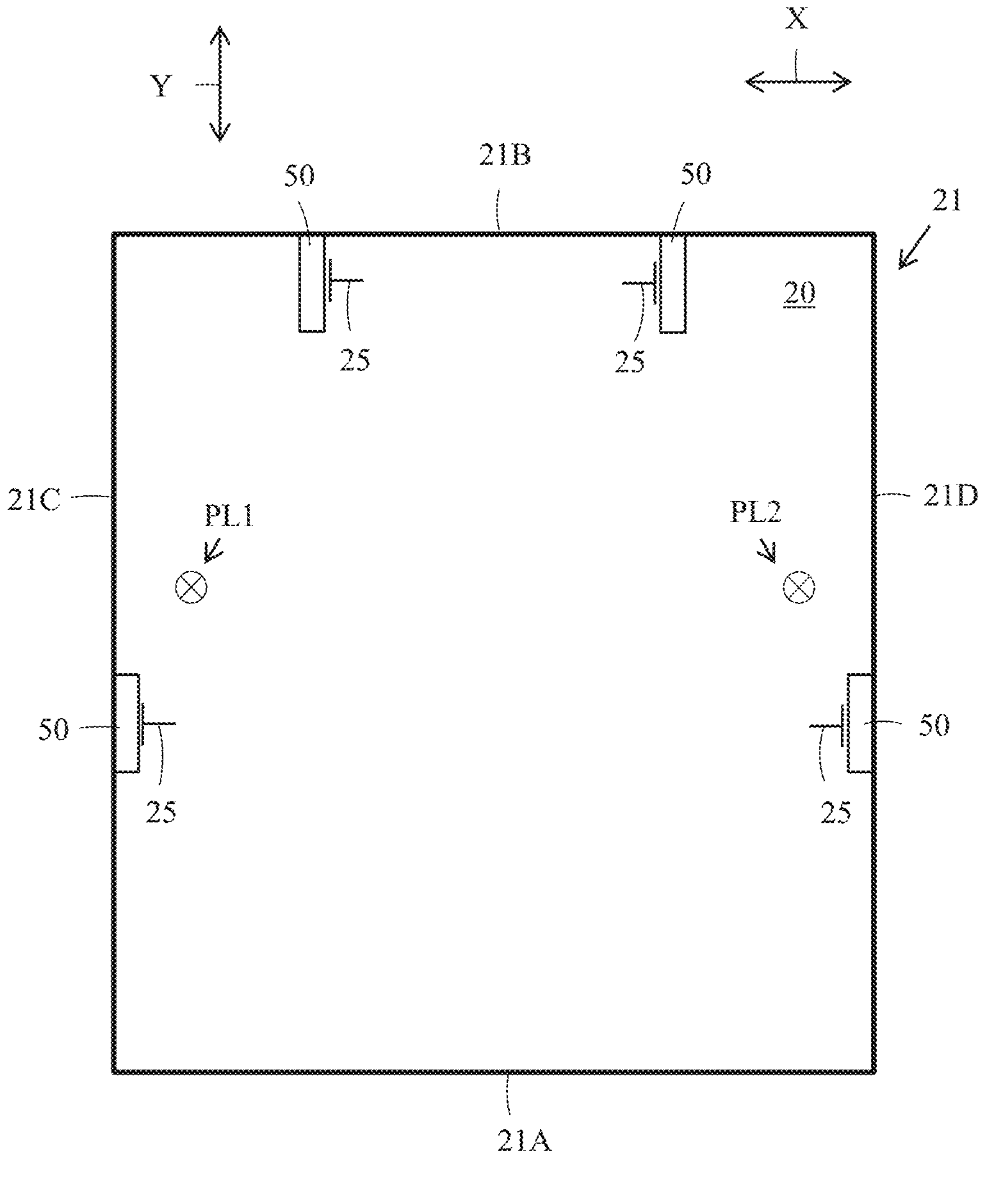
Figure 3:
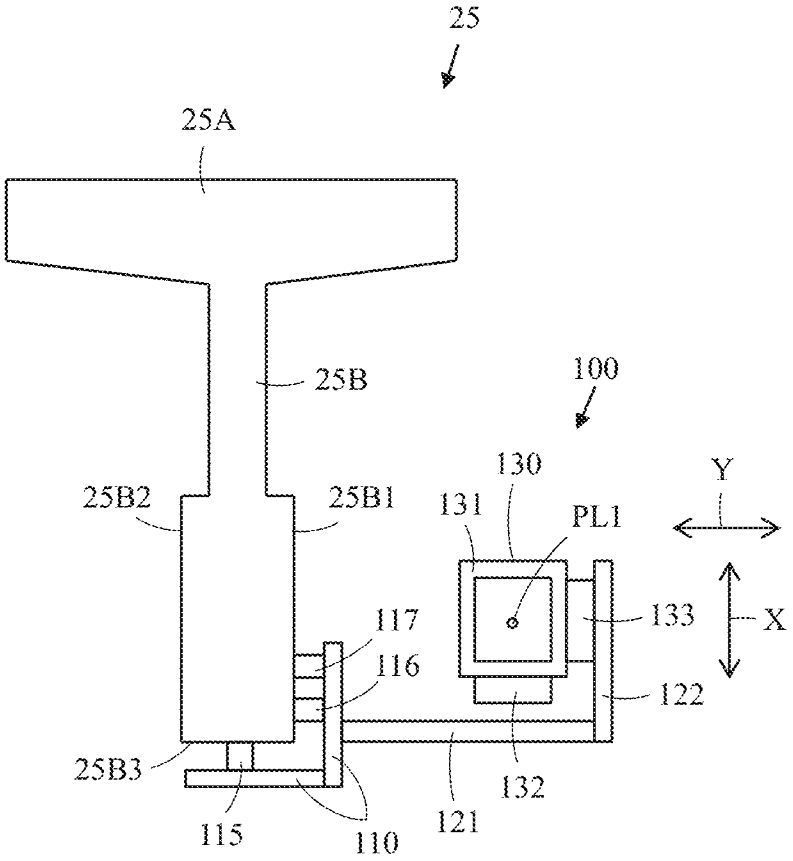
Figure 4:
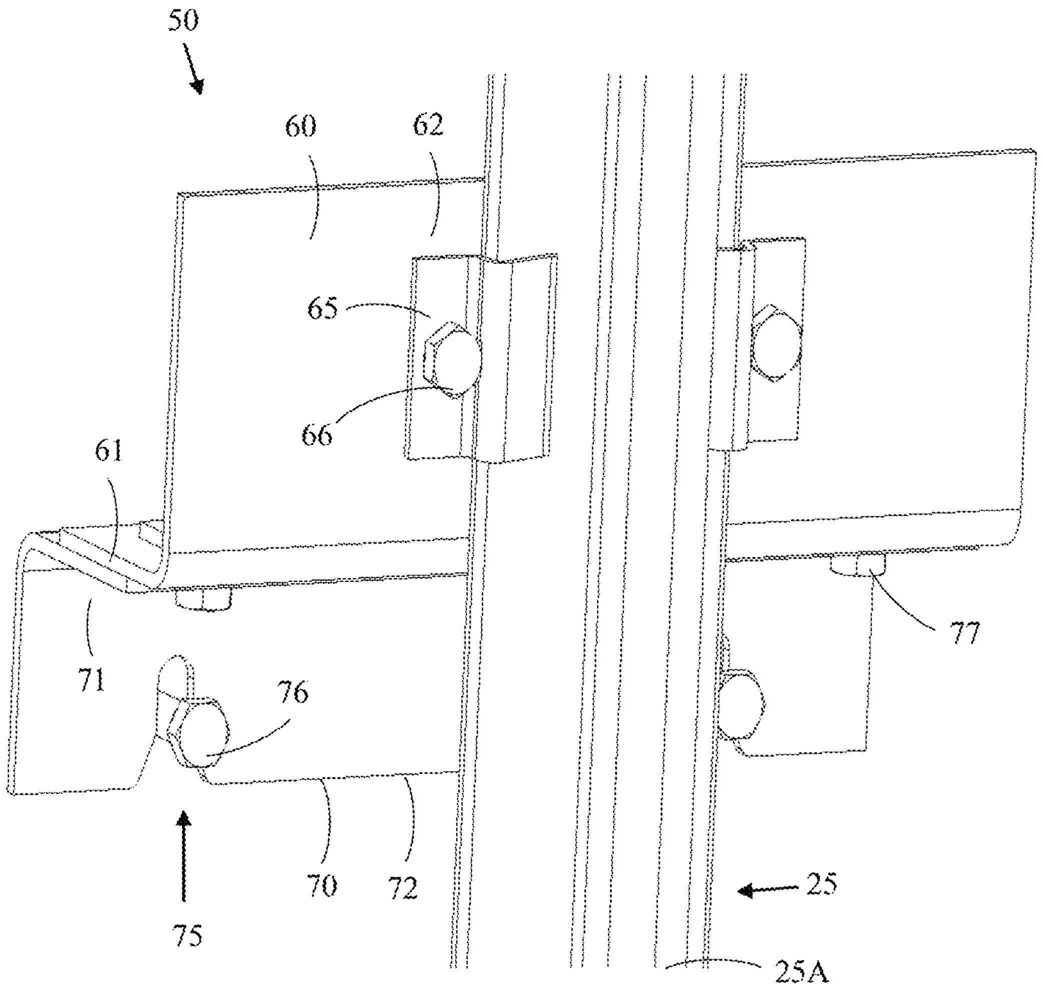
Figure 5:
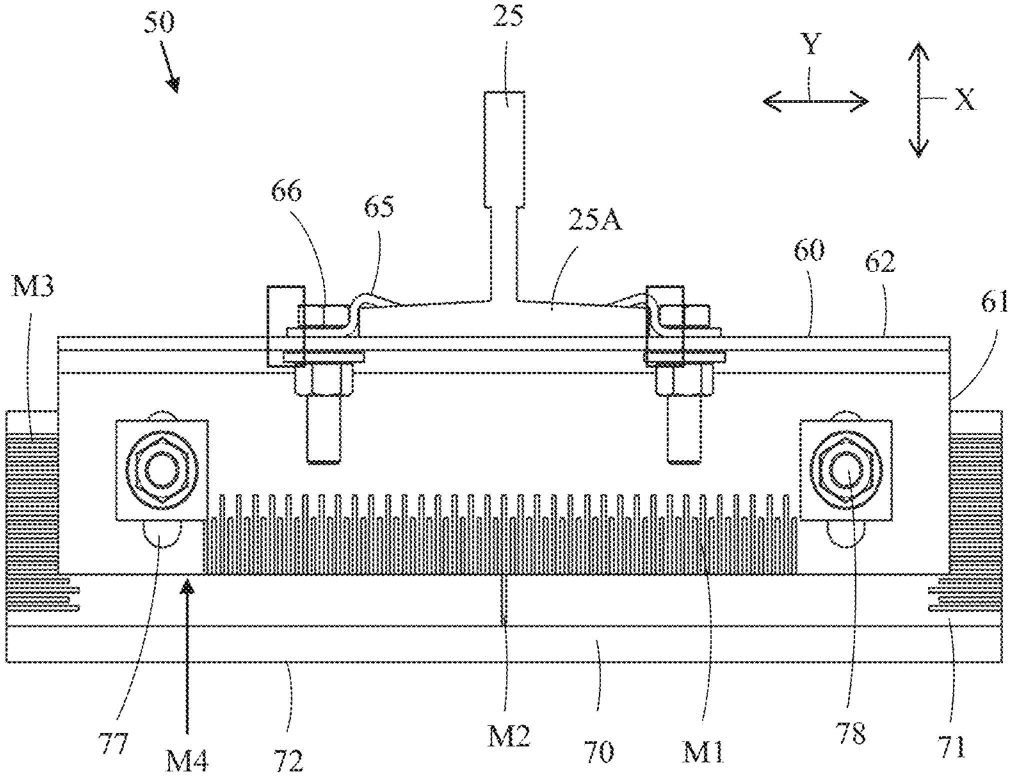
Figure 6:
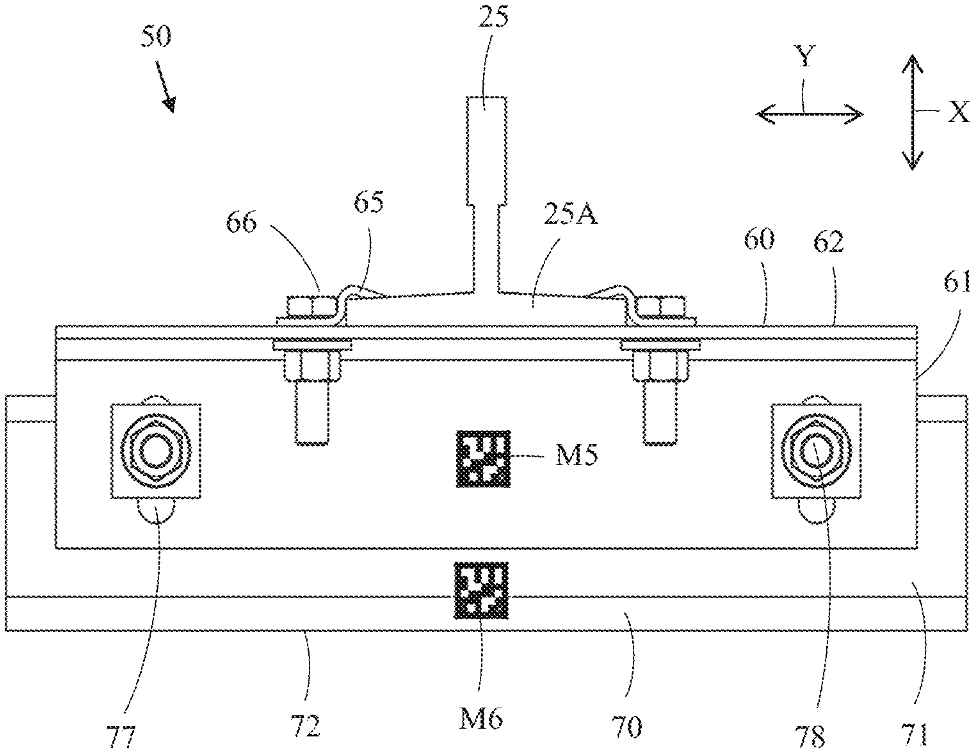
Figure 7:
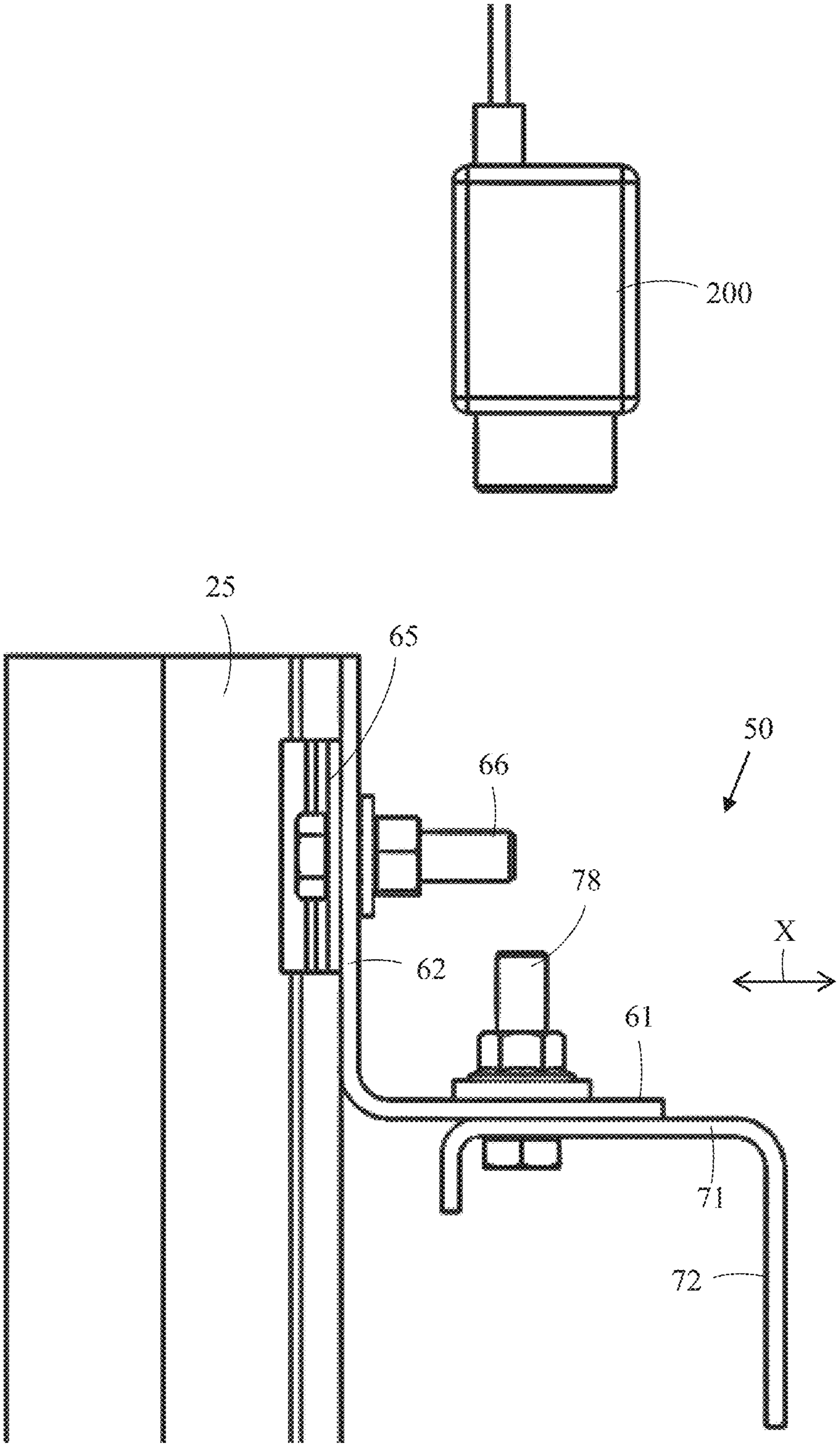
Figure 8:
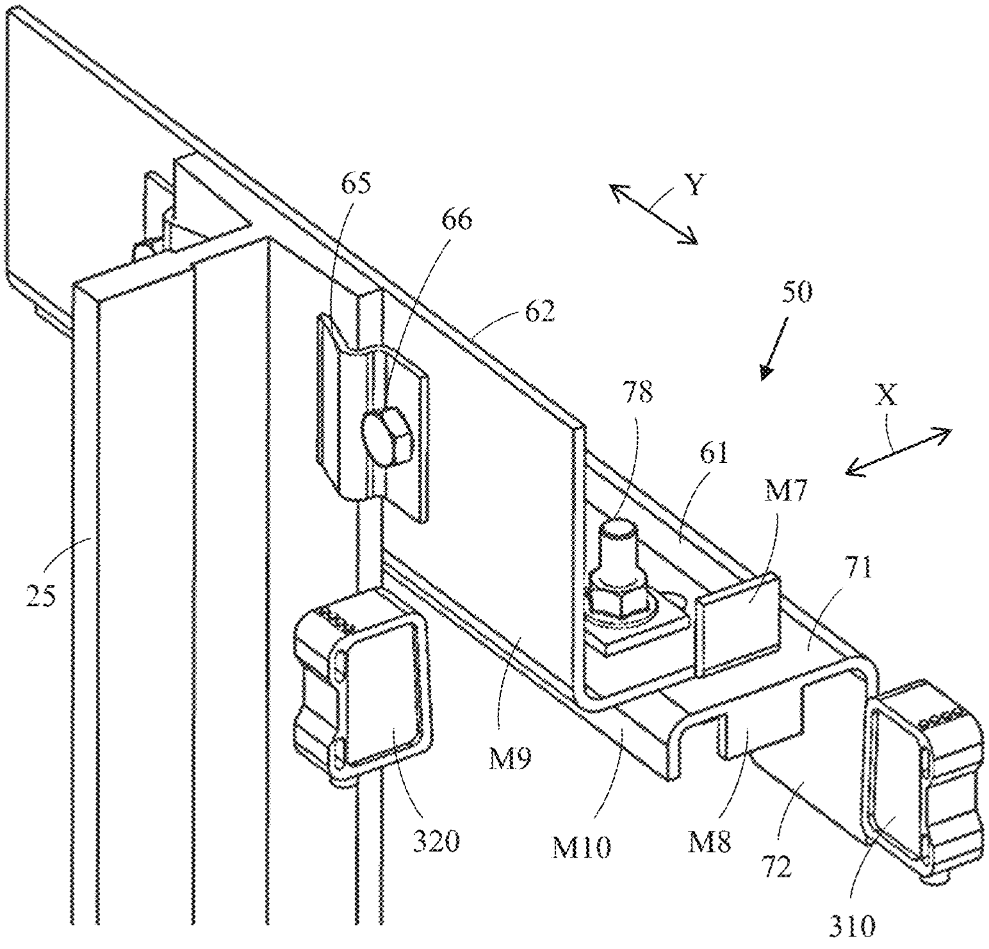
Figure 9:
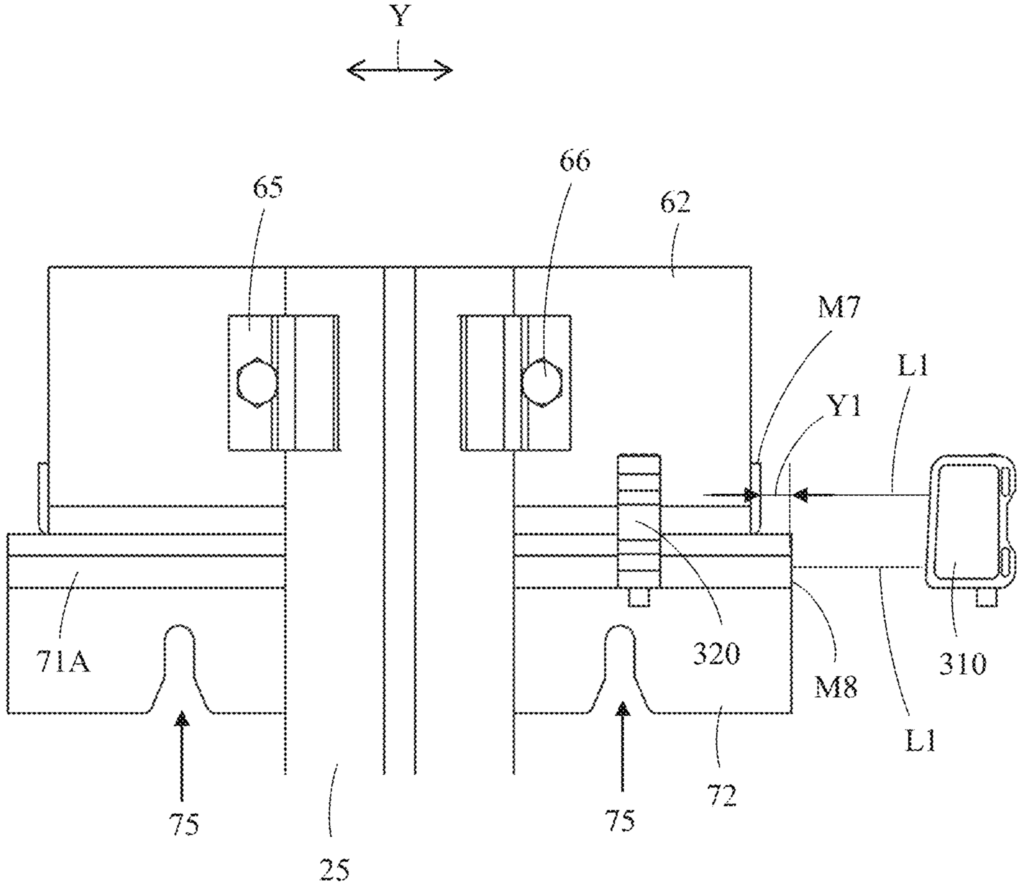

The invention will in the following be described in greater detail by means of preferred embodiments with reference to the attached drawings, in which FIG. 1 shows a side view of an elevator, FIG. 2 shows a horizontal cross section of the elevator, FIG. 3 shows an arrangement for measuring the alignment of the guide rails, FIG. 4 shows a fastening means, FIG. 5 shows a fastening means provided with a first embodiment of a position marking, FIG. 6 shows a fastening means provided with a second embodiment of a position marking, FIG. 7 shows a system based on computer vision for adjusting guide rails, FIG. 8 shows a first view of a system based on a line laser for adjusting guide rails, FIG. 9 shows a second view of a system based on a line laser for adjusting guide rails.

DETAILED DESCRIPTION

FIG. 1 shows a side view and FIG. 2 shows a horizontal cross section of the elevator.

The elevator may comprise a car 10, an elevator shaft 20, hoisting machinery 30, ropes 42, and a counterweight 41. A separate or an integrated car frame 11 may surround the car 10.

The hoisting machinery 30 may be positioned in the shaft 20. The hoisting machinery may comprise a drive 31, an electric motor 32, a traction sheave 33, and a machinery brake 34. The hoisting machinery 30 may move the car 10 in a vertical direction Z upwards and downwards in the vertically extending elevator shaft 20. The machinery brake 34 may stop the rotation of the traction sheave 33 and thereby the movement of the elevator car 10.

The car frame 11 may be connected by the ropes 42 via the traction sheave 33 to the counterweight 41. The car frame 11 may further be supported with guiding means 27 on guide rails 25 extending in the vertical direction in the shaft 20. The guiding means 27 may comprise rolls rolling on the guide rails 25 or gliding shoes gliding on the guide rails 25 when the car 10 is moving upwards and downwards in the elevator shaft 20. The guide rails 25 may be attached with fastening brackets 50 to the side wall structures 21 in the elevator shaft 20. The guiding means 27 keep the car 10 in position in the horizontal plane when the car 10 moves upwards and downwards in the elevator shaft 20. The counterweight 41 may be supported in a corresponding way on guide rails that are attached to the wall structure 21 of the shaft 20.

The wall structure 21 of the shaft 20 may be formed of solid walls 21 or of open beam structure or of any combination of these. One or more of the walls may thus be solid and one or more of the walls may be formed of an open beam structure. The shaft 20 may be comprise a front wall 21A, a back wall 21B and two opposite side walls 21C, 21D. There may be two guide rails 25 for the car 10. The two car guide rails 25 may be positioned on opposite side walls 21C, 21D. There may further be two guide rails 25 for the counterweight 41. The two counterweight guide rails 25 may be positioned on the back wall 21B.

The guide rails 25 may extend vertically along the height of the elevator shaft 20. The guide rails 25 may thus be formed of guide rail elements of a certain length e.g. 5 m. The guide rail elements 25 may be installed end-on-end one after the other. The guide rail elements 25 may be attached to each other with connection plates extending between the end portions of two consecutive guide rail elements 25. The connection plates may be attached to the consecutive guide rail elements 25. The ends of the guide rails 25 may comprise form locking means to position the guide rails 25 correctly in relation to each other. The guide rails 25 may be attached to the walls 21 of the elevator shaft 20 with support means at support points along the height of the guide rails 25.

The car 10 may transport people and/or goods between the landings in the building.

FIG. 2 shows reference lines PL1, PL2 in the shaft 20. The reference lines may be formed of plumb lines. The plumb lines may be realized by plumbing the shaft 20. The plumb lines could be formed of plumb wires. The reference lines PL1, PL2 may on the other hand be formed by light beams of light sources e.g. lasers having the light beams directed upwards along the reference lines PL1, PL2. One reference line and a gyroscope or two reference lines are normally needed for a global measurement reference in the shaft 20.

FIG. 1 shows a first direction Z, which is a vertical direction in the elevator shaft 20. FIG. 2 shows a second direction X, which is the direction between the guide rails (DBG) and a third direction Y, which is the direction from the back wall to the front wall (BTF) in the shaft 20. The second direction X is perpendicular to the third direction Y. The second direction X and the third direction Y are perpendicular to the first direction Z.

FIG. 3 shows an arrangement for measuring the alignment of the guide rails.

The figure shows an arrangement for measuring the alignment of the guide rails in accordance with EP 2 872 432 B1.

A cross-section of the guide rails 25 may have the form of a letter T having a flat bottom portion 25A and a flat support portion 25B protruding outwardly from the middle of the bottom portion 25A. The guide rail element 25 may be attached with fastening brackets 50 to a wall 21 in the shaft 20 from the bottom portion 25A of the guide rail element 25. The support portion 25B of the guide rail element 25 may form two opposite side support surfaces 25B1, 25B2 and one end support surface 25B3 for the guiding means of the car 10 or the counterweight 41. The guiding means may be provided with rollers or glide shoes acting on the support surfaces 25B1, 25B2, 25B3 of the support portion 25B of the guide rail element 25.

The measurement apparatus for measuring the alignment of guide rails may be based on a sensor arrangement 100. The sensor arrangement 100 may comprise a guide shoe 110 having a substantially L-shaped body. The body of the guide shoe 110 may extend along a first side support surface 25B1 of the guide rail 25 and along the third end support surface 25B3 of the guide rail 25. The body may be supported with a roller 115 on the end support surface 25B3 of the guide rail 25 and with two rollers 116, 117 on the first side support surface 25B1 of the guide rail 25. The body may further be provided with magnets (not shown in the figure) for keeping the body on the support portion 25B of the guide rail 25.

The sensor arrangement 100 may further comprise a first support arm 121 extending outwards from the body of the guide shoe 110 and a second support arm 122 being perpendicular to the first support arm 121. The length of the support arms 121, 122 may be adjustable to adjust the sensor arrangement 100 to different circumstances. The sensor means 130 may comprise a frame 131 with two sensors 132, 133. The frame 131 may be substantially rectangular. The sensors 132, 133 may be positioned on adjacent sides of the frame 131. The frame 131 may be supported on the second support arm 122. The frame 131 surrounds the reference line PL1. There is no contact between the reference line PL1 and the frame 131.

Each sensor 132, 133 may be formed of an optical sensor producing a bundle of parallel light beams. The light beams of the two sensors 132, 133 are thus perpendicular in relation to each other. The sensors 132, 133 may as a first option comprise a light source opposite to a light detector in which case the shadow of the reference line PL1 may be detected on the light detector. The sensors 132, 133 may as a second option be based on the reflexion principle in which case the light source and the light detector are positioned on the same side. The light reflected from the reference line PL1 may be detected in the light detector in the second option. The position of the reference line PL1 within the frame 131 may thus be determined in the second direction X i.e. the DBG direction and in the third direction Y i.e. the BTF direction. A deviation of the reference line PL1 from the desired position within the frame 131 at a measuring point means that the guide rail deviates in a corresponding way from the desired position at said measuring point.

The sensor arrangement 100 may be attached to the car 10 or to some other platform being arranged movable on the guide rails 25 so that the sensor arrangement 100 is movable upwards and downwards along the guide rails 25 in the shaft 20. The alignment of the guide rail 25 may thus be measured along the height of the shaft 20.

The height position of the car 10 or the platform in the shaft 20 may also be measured continuously during the measurement process. The height position of the car 10 in the shaft 20 may be measured with an encoder and/or with a laser. The measurement results of the sensor arrangement 100 may thus be allocated to the corresponding height position in the shaft 20.

The reference lines PL1, PL2 may be formed of plumbing wires. The reference lines PL1, PL2 could, however, also be formed of vertical laser beams. The sensor arrangement 100 could then be changed so that detection of the hit point of the laser beam within the frame 131 could be detected.

The measurement results may be stored in a memory.

FIG. 4 shows a fastening means.

The fastening means 50 may be formed of a fastening bracket 50. The fastening bracket 50 may comprise two separate bracket parts 60, 70 being movably attached to each other. The first bracket part 60 may have the shape of a letter L with a vertical portion 62 and a horizontal portion 61. The second bracket part 70 may also have the shape of a letter L with a vertical portion 72 and a horizontal portion 71. The first bracket part 60 may be attached to the guide rail 25 and a second bracket part 70 may be attached to a wall 21 in the shaft 20. The horizontal portions 61, 71 of the two bracket parts 60, 70 may be adjustably attached to each other.

The vertical portion 62 of the first bracket part 60 may be attached with a clamp 65 and a bolt 66 to the bottom portion 25A of the guide rail 25.

The vertical portion 72 of the second bracket part 70 may be attached to the wall 21 in the shaft 20 with anchor bolts 76. The vertical portion 72 in the second bracket part 70 may comprise oblong openings 75 being open at the lower end of the vertical portion 72 in the second bracket part 70. Holes for the anchor bolts 76 may be drilled into the walls 21 of the shaft 20 at predetermined positions already before the installation of the guide rails 25 is started. Anchor bolts 76 may be screwed into the holes. The anchor bolts 76 may be screwed only partly into the threading so that the head of the anchor bolts 76 is at a distance from the fastening surface.

The horizontal portion 61 of the first bracket part 60 and the horizontal portion 71 second bracket part 70 may be attached each other with bolts passing through oblong openings in the horizontal portion 61 of the first bracket part 60 and in the horizontal portion 71 of the second bracket part 70. The oblong openings may be dimensioned so that it is possible to fine adjust the position of the first bracket part 60 in relation to the second bracket part 70 to be able to align the guide rails 25.

Tightening of the bolts 76 will attach the second bracket part 70 of the fastening bracket 50 to the wall 21 in the shaft 20.

FIG. 5 shows a fastening means provided with a first embodiment of a position marking.

The fastening means 50 may be formed of a fastening bracket 50. The fastening bracket 50 may comprise two bracket parts 60, 70 being adjustable in relation to each other.

The guide rail 25 is attached with clamps 65 and bolts 66 to the vertical portion 62 of the first bracket part 60. The vertical portion 72 of the second bracket part 70 is attached to the wall construction in the shaft (not shown in the figure).

The horizontal portion 71 of the second bracket part 70 is attached to the horizontal portion 61 of the first bracket part 60 with bolts 78 passing through oblong openings 77 in the horizontal portion 61, 71 of each bracket part 60, 70. The oblong openings 77 make it possible to adjust the bracket parts 60, 70 in relation to each other in the second direction X and also in the third direction Y.

The horizontal portion 61 of the first bracket part 60 may be provided with a first position marker M1 and the horizontal portion 71 of the second bracket part 70 may be provided with a second position marker M2. The first position marker M1 may be formed of spaced apart lines and the second position marker M2 may be formed of a reference line. The position of the first bracket part 60 in relation to the second bracket part 70 in the third direction Y may thus be determined by the position of the reference line M2 in relation to the space apart lines M1.

The horizontal portion 71 of the second bracket part 70 may be provided with a third position marker M3 on each side of the horizontal portion 61 of the first bracket part 60. The third position marker M3 may be formed of spaced apart lines. The outer edge of the horizontal portion 61 of the first bracket part 60 may form a fourth position marker M4 i.e. a reference line. The position of the first bracket part 60 in relation to the second bracket part 70 in the second direction X may thus be determined by the position of the reference line M4 in relation to the spaced apart lines M4.

The first position marker M1 and the third position marker M3 may be formed of parallel lines having an internal distance of 1 to 2 mm. The first position marker M1 and the third position marker M3 may thus form a kind of a ruler.

The position markers M1, M3 i.e. the rulers and the reference lines M2, M4 make it possible to adjust the bracket parts 60, 70 into a correct position in relation to each other based on the previously done alignment measurements of the guide rail stored in the memory. The alignment measurements done at each fastening bracket 50 determine the deviation of the present position of the guide rail 25 from the desired position. It is thus possible to directly adjust the position of the bracket parts 60, 70 in relation to each other so that the desired position of the guide rail 25 is achieved based on the position markers M1-M4. There is no need to make any measurements from the plump lines PL1, PL2 during the adjustment of the guide rails 25.

FIG. 6 shows a fastening means provided with a second embodiment of a position marker.

The fastening means 50 may be formed of a fastening bracket 50. The fastening bracket 50 may comprise two bracket parts 60, 70 being adjustable in relation to each other.

The guide rail 25 is attached with clamps 65 and bolts 66 to the vertical portion 62 of the first bracket part 60. The vertical portion 72 of the second bracket part 70 is attached to the wall construction in the shaft (not shown in the figure).

The horizontal portion 71 of the second bracket part 70 is attached to the horizontal portion 61 of the first bracket part 60 with bolts 78 passing through oblong openings 77 in the horizontal portion 61, 71 of each bracket part 60, 70. The oblong openings 77 make it possible to adjust the bracket parts 60, 70 in relation to each other in the second direction X and also in the third direction Y.

The horizontal portion 61 of the first bracket part 60 may be provided with a first position marker M5 in the form of a printed pattern and the horizontal portion 71 of the second bracket part 70 may be provided with a second position marker M6 in the form of a printed pattern.

A camera may be used to measure the spot of the first position marker M5 and the second position marker M6 and to calculate the offset in the second direction X and in the third direction Y. Regular scale lines are thus not needed in this embodiment.

FIG. 7 shows a system based on computer vision for adjusting guide rails.

Computer vision in the form of e.g. a camera 200 may be used to monitor the position markers on the bracket parts 60, 70 in the fastening bracket 50.

The camera may measure the spot of the first position marking M5 and the second position marker M6 and calculate the offset in the second direction X and in the third direction Y.

FIG. 8 shows a first view of a system based on a line laser for adjusting guide rails.

The horizontal portion 61 of the first part 60 of the bracket 50 may be provided with a first position marker M7 in the form of a reference surface and the horizontal portion 71 of the second part 70 of the bracket 50 may be provided with a second position marker M8 in the form of a reference surface.

The vertical portion 62 of the first bracket part 60 may form a third position marker M9 and a vertical portion in the outer edge of the horizontal portion 71 of the second bracket part 70 may form a fourth position marker M10.

A first line laser 310 may be used to measure the position of the first position marking M7 in relation to the second position marker M8 i.e. the position of the bracket parts 60, 70 in relation to each other in the third direction Y.

A second line laser 320 may be used to measure the position of the third position marker M9 in relation to the fourth position marker M10 i.e. the position of the bracket parts 60, 70 in relation to each other in the second direction X.

Two second lasers 320, one on each side of the guide rail 25, are needed to adjust the bracket parts 60, 70 in the second direction X. The twist of the guide rail 25 may also be adjusted with the help of the two second lasers 320.

FIG. 9 shows a second view of a system based on a line laser for adjusting guide rails.

The figure shows how the position of the bracket parts 60, 70 in relation to each other in the third direction Y may be measured. The third direction Y is the direction between the back wall and the front wall (BTF) in the shaft.

The first line laser 310 may first be positioned so that the laser beam L1 is directed to the second position marker M8 i.e. the reference surface on the horizontal portion 71 of the second bracket part 70. The first line laser 310 may then be moved vertically upwards so that the laser beam L1 is directed towards the first position marker M7 i.e. the reference surface on the horizontal portion 61 of the first bracket part 60. The distance Y1 in the third direction Y between the first position marker M7 and the second position marker M8 i.e. the reference surface on the horizontal portion 71 of the second bracket part 70 may thus be measured with the first line laser 310.

The second line laser 320 may be used in an analogous way to measure the position of the first bracket part 60 in relation to the second bracket part 70 in the second direction X. Two second line lasers 320 would be needed to measure the second direction X. The second line lasers 320 could be positioned on opposite sides of the guide rail 25 in the third direction Y.

The figures show adjustable fastening means 50 formed of adjustable fastening brackets 50. The adjustable fastening means 50 could, however, be formed of any kind of adjustable fastening means 50 being positioned between the guide rail 25 and the fixed support point in the shaft 20. The fastening means 50 could e.g. include divider beams dividing the shaft into two sub-shafts. The divider beams could also be adjustable. The position markers could be positioned on a fixed position in the shaft and on the moving part of the adjustable fastening means.

The measurement results may be stored in a local memory at the site and/or in a remote memory outside the site. The measurement results may be transmitted by wireless communication and/or by cable to the memory.

The use of position markers M1-M10 in connection with the fastening means 50 shown in the figures forms one advantageous way of realizing the separate aligning step. The measurement results received in the measuring step are used to adjust the fastening means 50 based on the position markers M1-M10.

The aligning step could, however, be realized also without position markers M1-M10.

The alignment without position markers M1-M10 may be done by e.g. using the global reference lines PL1, PL2 as local reference lines in the aligning step. The alignment may be done from the local reference lines PL1, PL2 based on the results of the measuring step stored in the memory.

The measurement tool disclosed in EP 2 872 432 B1 could be used in the measuring step and in the separate aligning step for aligning the guide rails without markers. The global reference lines PL1, PL2 would thus be used as local reference lines. The following example clarifies the situation. The measuring step may first be performed with the measurement tool. The measurement tool may in the measuring step give the result DBG=2 mm and BTF=2 mm for fastening means no 5.

The same measurement tool may then be used in the separate aligning step. The measurement tool may be used to determine the position of the guide rail 25 in relation to the local reference line PL1, PL2. The measurement tool may in the aligning step give the result DBG=6 mm and BTF=6 mm for fastening means no 5. The difference in the measurement values achieved in the measuring step and in the separate aligning step are caused by the bending of the shaft during the separate aligning step. Adjustment of the guide rail at fastening means no 5 must be done according to the results achieved in the measuring step. The guide rail 25 should thus be adjusted to position DGB=4 mm and BTF=4 mm with the help of the measurement tool to achieve a correct position of the guide rail 25 in a straight shaft. The results DBG=2 mm and BTF=2 mm achieved in the measuring step are thus used in the adjustment of the fastening means 50 in the aligning step.

The alignment tool disclosed in EP 2 993 152 B1 could be used in the measuring step and in the separate aligning step for aligning the guide rails without markers. The global reference lines PL1, PL2 would not be needed at all in the aligning step in this case.

The alignment tool may be used in the measuring step to measure the alignment of the guide rail line. The global reference lines PL1, PL2 may be used to determine the position of the alignment tool in the shaft. The position of the guide rails in the shaft are determined in relation to the position of the alignment tool in the shaft. This may be done directly in the alignment tool.

The alignment tool may then be used in the separate aligning step to align the guide rails. There is no need to know the position of the alignment tool in the shaft in the separate aligning step. The global reference lines PL1, PL2 are thus not needed in the aligning step. The alignment tool may directly adjust the position of the guide rails at each fastening means based on the measurement results stored into the memory.

The shaft 20 in the figures is intended for only one car 10, but the invention could naturally be used in shafts intended for several cars 10. Such elevator shafts 10 could be divided into sub-shafts for each car 10 with steel bars. Horizontal steel bars could be provided at predetermined intervals along the height of the shaft 20. A part of the guide rails 25 would then be attached to the steel bars in the shaft 20. Another part of the guide rails 25 would be attached to solid walls 21 in the shaft 20.

The invention may be used in low rise or in high rise buildings. The benefits of the invention are naturally greater in high rise buildings. High rise buildings may have a hoisting height over 75 meters, preferably over 100 meters, more preferably over 150 meters, most preferably over 250 meters.

The use of the invention is not limited to the elevator disclosed in the figures. The invention can be used in any type of elevator e.g. an elevator comprising a machine room or lacking a machine room, an elevator comprising a counterweight or lacking a counterweight. The counterweight could be positioned on either side wall or on both side walls or on the back wall of the elevator shaft. The drive, the motor, the traction sheave, and the machine brake could be positioned in a machine room or somewhere in the elevator shaft. The car guide rails could be positioned on opposite side walls of the shaft or on a back wall of the shaft in a so called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. A method for aligning elevator guide rails, the method comprising:

a supporting step in which guide rails are supported in a shaft by adjustable fasteners to form guide rail lines, the adjustable fasteners each including a first part and a second part adjustable in relation to each other, the first part being attachable to a guide rail from among the guide rails, and the second part being attachable to a fixed support point in the shaft, a measuring step in which alignment of the guide rails being supported by the adjustable fasteners in the shaft and forming the guide rail lines are measured at measurement points along a height of a guide rail line from among the guide rail lines based on at least one reference line provided in a vicinity of the guide rail line, a recording step in which measurement results of each measurement point from among the measurement points are stored into a memory, the measurement points indicating a deviation of the guide rails from the at least one reference line, and an aligning step, separate from the supporting step, in which the guide rails are aligned based on the measurement results stored in the memory, the aligning step being carried out after the guide rails are supported in the shaft and the measurement results of all the measurement points have been stored in the memory, wherein the aligning step comprises adjusting the first part and the second part of the adjustable fasteners using position markers on the first part and the second part to adjustably position the guide rails based on the deviation.

2. The method as claimed in claim 1, wherein the aligning step comprises adjusting the adjustable fasteners based on the measurement results stored in the memory and the position markers, the position markers forming local reference points for adjustment of the adjustable fasteners.

3. The method as claimed in claim 2, wherein at least one position marker from among the position markers is provided on each of the first part and the second part of the adjustable fasteners for determining positions of the first part and the second part in relation to each other.

4. The method as claimed in claim 3, wherein one of the first part and the second part of the adjustable fasteners is provided with spaced apart parallel lines forming a first position marker of the position markers, and another one of the first part and the second part is provided with a reference line forming a second position marker of the position markers.

5. The method as claimed in claim 3, wherein each of the first part and the second part of the adjustable fasteners is provided with printed patterns forming the position markers, or each of the first part and the second part of the adjustable fasteners is provided with reference surfaces forming the position markers.

6. The method as claimed in claim 5, wherein computer vision is used to determine positions of the printed patterns in relation to each other.

7. The method as claimed in claim 5, wherein at least one line laser is used to determine positions of the reference surfaces in relation to each other.

8. An arrangement for aligning elevator guide rails comprising at least one reference line in a vicinity of guide rails, the guide rails being supported by adjustable fasteners in a shaft and forming guide rail lines, a sensor arrangement configured to measure alignment of the guide rail lines at measurement points along a height of a guide rail line from among the guide rail lines based on the at least one reference line, and a memory configured to store measurement results at each measurement point from among the measurement points, and wherein the adjustable fasteners are configured to be adjustable to move the guide rails into alignment based on the measurement results stored in the memory after the guide rails are supported in the shaft and the measurement results of all the measurement points have been stored in the memory, and wherein the adjustable fasteners comprise two parts that are separate and adjustable in relation to each other, a first part of the two parts being attachable to a guide rail element of the guide rails and a second part of the two parts being attachable to a fixed support point in the shaft.

9. The arrangement as claimed in claim 8, wherein the adjustable fasteners are configured to be adjustable based on the measurement results stored in the memory and based on position markers, the position markers forming local reference points for adjustment of the adjustable fasteners.

10. The arrangement as claimed in claim 8, wherein at least one position marker is provided on each of the first part and the second part of the adjustable fasteners for determining positions of the first part and the second part in relation to each other.

11. The arrangement as claimed in claim 10, wherein one of the first part and the second part of the adjustable fasteners is provided with spaced apart parallel lines forming a first position marker of the at least one position marker, and another of the first part and the second part is provided with a reference line forming a second position marker of the at least one position marker.

12. The arrangement as claimed in claim 10, wherein each of the first part and the second part of the adjustable fasteners is provided with printed patterns forming first position markers of the at least one position marker, or wherein each of the first part and the second part of the adjustable fasteners is provided with reference surfaces forming second position markers of the at least one position marker.

13. The arrangement as claimed in claim 12, further comprising computer vision configured to determine positions of the printed patterns in relation to each other.

14. The arrangement as claimed in claim 12, further comprising at least one line laser configured to determine positions of the reference surfaces in relation to each other.

15. An arrangement for aligning elevator guide rails comprising:

at least one reference line in a vicinity of guide rails, the guide rails being supported by adjustable fasteners in a shaft and forming guide rail lines;

a sensor arrangement configured to measure alignment of the guide rail lines at measurement points along a height of a guide rail line from among the guide rail lines based on the at least one reference line; and a memory configured to store measurement results at each measurement point from among the measurement points, and wherein the adjustable fasteners are configured to be adjustable to move the guide rails into alignment based on the measurement results stored in the memory after the guide rails are supported in the shaft and the measurement results of all the measurement points have been stored in the memory, and wherein the adjustable fasteners comprise two parts that are separate and adjustable in relation to each other, and the two parts of the adjustable fasteners include position markers that are configured for setting positions of the two parts in relation to each other.

* * * * *